US006841515B2

(12) United States Patent
Burnham

(10) Patent No.: US 6,841,515 B2
(45) Date of Patent: Jan. 11, 2005

(54) PRODUCTION AND USE OF BIOSOLID GRANULES

(75) Inventor: Jeffrey C. Burnham, Naples, FL (US)

(73) Assignee: Unified Enviromental Services Group, L.L.C., Edison, NJ (US)

( * ) Notice: Subject to any disclaimer, the term of this patent is extended or adjusted under 35 U.S.C. 154(b) by 0 days.

(21) Appl. No.: 10/051,387

(22) Filed: Jan. 22, 2002

(65) Prior Publication Data

US 2002/0098982 A1 Jul. 25, 2002

Related U.S. Application Data

(60) Provisional application No. 60/262,631, filed on Jan. 22, 2001, and provisional application No. 60/272,469, filed on Mar. 2, 2001.

(51) Int. Cl.$^7$ .......................... A01N 25/26; C05G 5/00; A62D 3/00
(52) U.S. Cl. ..................... 504/102; 504/117; 504/359; 504/367; 71/64.02; 71/64.11; 514/963; 514/964; 435/262.5; 424/475; 588/205; 588/261; 588/901
(58) Field of Search .............................. 504/102, 117, 504/359, 367; 71/64.02, 64.11; 514/963, 964; 435/262.5; 424/475; 588/205, 261, 901

(56) References Cited

U.S. PATENT DOCUMENTS

| | | | |
|---|---|---|---|
| 2,800,457 A | 7/1957 | Green et al. | 252/316 |
| 2,800,458 A | 7/1957 | Green | 252/316 |
| 3,259,482 A | 7/1966 | Hansen | 71/64 |
| 3,264,088 A | 8/1966 | Hansen | 71/64 |
| 3,264,089 A | 8/1966 | Hansen | 71/64 |
| 3,475,154 A | 10/1969 | Kato | 71/64.07 |
| 3,796,669 A | 3/1974 | Kiritani et al. | 252/316 |
| 4,001,140 A | 1/1977 | Foris et al. | 252/316 |
| 4,079,003 A | 3/1978 | Manchak | 588/205 |
| 4,100,103 A | 7/1978 | Foris et al. | 252/316 |
| 4,180,459 A | 12/1979 | Zievers | 210/10 |
| 4,270,279 A | 6/1981 | Roediger | 34/9 |
| 4,500,428 A | 2/1985 | Lynch et al. | 210/609 |
| 4,554,002 A | 11/1985 | Nicholson | 71/12 |
| 4,601,863 A | 7/1986 | Shioi et al. | 264/4.3 |
| 4,711,659 A | 12/1987 | Moore | 504/231 |
| 4,772,490 A | 9/1988 | Kogler et al. | 427/212 |
| 4,781,842 A | 11/1988 | Nicholson | 210/751 |
| 4,902,431 A | 2/1990 | Nicholson et al. | 210/751 |
| 4,966,706 A | 10/1990 | Gregor | 210/609 |
| 4,997,572 A | 3/1991 | Wurtz | 210/710 |
| 5,051,031 A | 9/1991 | Schumacher et al. | 405/129 |
| 5,125,951 A | 6/1992 | Lahoda et al. | 71/12 |
| 5,135,664 A | 8/1992 | Burnham | 210/751 |
| 5,186,840 A | 2/1993 | Christy et al. | 210/709 |
| 5,252,116 A | 10/1993 | Markham et al. | 71/13 |
| 5,259,977 A | 11/1993 | Girovich et al. | 210/770 |
| 5,275,733 A | 1/1994 | Burnham | 210/609 |
| 5,340,376 A * | 8/1994 | Cunningham | 71/6 |
| 5,342,442 A | 8/1994 | Nechvatal et al. | 106/409 |
| 5,346,527 A | 9/1994 | Rehbein et al. | 71/12 |
| 5,385,673 A | 1/1995 | Fergen | 210/710 |
| 5,401,402 A | 3/1995 | Christy et al. | 210/205 |
| 5,409,605 A | 4/1995 | Haley et al. | 210/199 |
| 5,419,839 A | 5/1995 | Haley et al. | 210/751 |
| 5,500,044 A | 3/1996 | Meade et al. | 106/697 |
| 5,554,279 A | 9/1996 | Christy | 210/149 |
| 5,580,458 A | 12/1996 | Yamasaki et al. | 210/609 |
| 5,593,590 A | 1/1997 | Steyskal | 210/603 |
| 5,593,591 A | 1/1997 | Ohsol et al. | 210/609 |
| 5,603,842 A | 2/1997 | Whitaker et al. | 210/743 |
| 5,618,442 A | 4/1997 | Christy | 210/742 |
| 5,635,069 A | 6/1997 | Boss et al. | 210/609 |
| 5,669,969 A | 9/1997 | Meade et al. | 106/697 |
| 5,679,129 A | 10/1997 | Hon | 71/64.11 |
| 5,681,481 A | 10/1997 | Christy et al. | 210/723 |
| 5,733,355 A | 3/1998 | Hibino et al. | 71/6 |
| 5,766,302 A | 6/1998 | Lefroy et al. | 71/28 |
| 5,783,073 A | 7/1998 | Christy et al. | 210/205 |
| 5,807,724 A * | 9/1998 | Resnick | 435/177 |
| 5,849,060 A | 12/1998 | Diping et al. | 71/64.07 |
| 5,853,450 A | 12/1998 | Burnham et al. | 71/9 |
| 5,853,590 A | 12/1998 | Burnham | 210/609 |
| 5,862,610 A * | 1/1999 | Lipert | 34/377 |
| 5,876,613 A | 3/1999 | Bonnin et al. | 210/609 |
| 5,906,750 A | 5/1999 | Haase | 210/727 |
| 5,916,448 A | 6/1999 | Fergen | 210/723 |
| 5,984,992 A | 11/1999 | Greer et al. | 71/11 |
| 5,993,505 A | 11/1999 | Tijsma et al. | 71/64.11 |
| 6,051,411 A * | 4/2000 | Turtakovsky et al. | 435/178 |
| 6,103,191 A | 8/2000 | Luker | 422/38 |
| 6,159,263 A | 12/2000 | Greer et al. | 71/11 |
| 6,165,550 A | 12/2000 | Markusch et al. | 427/221 |
| 6,176,891 B1 | 1/2001 | Komoriya et al. | 71/11 |
| 6,187,074 B1 | 2/2001 | von Locquenghien et al. | 71/64.07 |
| 6,237,264 B1 | 5/2001 | Gulick, Jr. | 40/454 |
| 6,256,902 B1 | 7/2001 | Flaherty et al. | 34/379 |
| 6,284,278 B1 * | 9/2001 | Waldman et al. | 424/489 |
| 6,325,035 B1 | 12/2001 | Codina et al. | 123/179.1 |
| 6,331,300 B1 | 12/2001 | Dybas et al. | 424/93.4 |
| 6,465,706 B1 * | 10/2002 | Rogers et al. | 588/1 |
| 2002/0053229 A1 * | 5/2002 | Varshovi | 71/6 |

FOREIGN PATENT DOCUMENTS

| | | | |
|---|---|---|---|
| DE | 41 27 459 | * 2/1993 | |
| WO | 98/56735 A1 | 12/1998 | |
| WO | 0136082 | 5/2001 | B01J/8/24 |
| WO | 0136887 | 5/2001 | F26B/3/084 |
| WO | 0168562 | 9/2001 | C05F/7/00 |
| WO | 0169150 | 9/2001 | F26B/3/08 |

* cited by examiner

*Primary Examiner*—S. Mark Clardy
(74) *Attorney, Agent, or Firm*—Morrison & Foerster LLP

(57) ABSTRACT

This invention relates to the production and use of encapsulated and/or concentrically-constructed fertilizer or bioremediation granules such as, for example, granules of 0.5 mm to 10 mm in diameter constructed so that there are at least two components to the granule including a core with a surrounding capsule or a core with one or more concentric layers that are distinguishable from the core with respect to nutrient content, density, hardness, solubility, composition, microbial content and permeability, as in permeability to odors or the permeability of nutrients that might volatize to the atmosphere or leach into the soil. The basic idea was to create a method for manufacturing and using fertilizer granules, which incorporate multiple concentric layers or a core plus an encapsulating outer layer.

44 Claims, No Drawings

PRODUCTION AND USE OF BIOSOLID GRANULES

Application claims the benefit of Divisional Appli. No. 60/262,631, filed Jan. 22, 2001 which claims benefit 60/272,469, filed Mar. 2, 2001.

BACKGROUND

1. Field of the Invention

This invention relates generally to fertilizers and to bioremediation and more specifically to the use of nutrients and micro-organisms for bioremediation.

2. Description of the Background

A goal of fertilizer manufacture is to produce chemically homogeneous granules that resist dusting and that are hard enough to resist crushing forces of at least pounds force. Hardness is a particularly useful quality of fertilizer granules used in agriculture and hardness (resistance to force) of greater than 4 pounds is particularly desired.

Historically, particulate fertilizers possessed a number of known defects, the most notable being the too rapid release of soluble plant food, causing phytotoxicity and the rapid depletion of the plant nutrients by leaching. Other problems included tendencies to cake and form dust. These problems are, for example reviewed in U.S. Pat. Nos. 3,475,154, 3,259,482, 3,264,088, 3,264,089, 4,711,659, and 4,772,490, and Japanese Patent No. 52-38361.

Most fertilizers, such as those that consist of or comprise ammonium sulfate, urea, diammonium phosphate or calcium phosphate are not manufactured specifically to have concentric layers. Some fertilizer granules are however made with specific coatings. These coatings help control the rate of nutrient release to treated soil and help prevent dusting of the granule itself. For example, U.S. Pat. No. 6,165,550 relates to the production of symmetrical fertilizer granules that are coated with polyurea-urethane to slow leaching of the granule nutrients into the soil. Other granules, as found in U.S. Pat. Nos. 5,679,129; 6,176,891 and 5,993,505, relate to a synthetic resin or polymer film on the surface of the granule to control the release of plant nutrients from the interior of the granule. Similarly, U.S. Pat. No. 6,187,074 relates to a coating of carboxyl-carrying ethylene copolymer to contain inorganic or organic fertilizer such that it is released slowly over time to the target crops.

Although biosolids have been processed into fertilizer, the methods used often require expensive processing to inactivate harmful or noxious substances. Some of these substances may arise during storage, and some form through air contact. Although not generally useful because of their cost, these fertilizers would be desirable because of the nutritional elements often present in the biosolids. Large scale use generally is prohibitive however, because of the cost.

Biosolids produced from municipal wastewater treatment usually are dried into irregular soil like preparations or alternatively dried into pellet forms. U.S. Pat. No. 5,849,060 relates to a dilute sulfuric acid or phosphoric acid to bind inorganic nutrients to a nucleus of water soluble fertilizer. As asserted in this patent, the outer coat of inorganics controls the release rate of the nutrient compounds by regulating the solubilities of the limited-soluble outer compounds. U.S. Pat. No. 5,766,302, describes granules that use an adhesive to stick an outer coating onto the surface of the underlying granule. U.S. Pat. No. 5,733,355, relates to the drying of bacteria and application of such to condition soil for plant cultivation, but does not specify a means of delivering said bacteria other than indicating a suitable carrier such as zeolite, diatomaceous earth or greenstuff. Greer et al. (U.S. Pat. Nos. 5,984,992 and 6,159,263) relates to rolling a melt of acid, water and sewage sludge into a granule which is then dried. U.S. Pat. No. 6,159,263 also relates to methods whereby zinc containing spent acids is used in the granule forming process to introduce zinc as a micronutrient into the granule. U.S. Pat. No. 6,331,300 relates to the use of porous particles impregnated with various nutrients or microorganisms for the facilitation of bioremediation. These patents address variations in pore size and length to control the rate of release of one type of impregnated substance. As there is only one type of substance per particle, multiple applications with several different types of particles generally is required to optimize effectiveness of bioremediation.

SUMMARY OF THE INVENTION

The invention alleviates the problems of with current strategies and designs for treating biosolids. Embodiments of the invention provide compositions for fertilizer and/or bioremediation granules that are useful for crop fertilization and soil bioremediation and methods for their production and use.

Coating (encapsulation) of a core with one or more outer layers as described herein provides several advantages for using the biosolids as fertilizer. The layer(s) add value to the biosolid in at least three ways. One, the layer(s) limit the release of odorants from biosolids. Two, a layer may be manufactured from materials that have a high concentration of a micronutrient such as zinc, as suited for the end use. Three, heat sensitive microorganism(s) may be added to one or more layers of the granule after the core (containing the biosolids material) has been formed. Many desirable procedures for generating core biosolid material involve high heat that would kill many organisms. For example, many materials may be brought to a high temperature to achieve the USEPA's Class A standard for treatment of pathogens and then cooled. Embodiments of the invention use a matrix, which in some cases consists of a two component system, a first granule core that is processed to remove pathogens and/or metals and a second coating material. In these embodiments the second coating material is processed to a) form a barrier to rapid dissolution, b) bind up micronutrients as needed and c) bind up desired micro-organisms as needed.

An embodiment of the invention is directed to fertilizer and bioremediation granules having one or more concentric layers and a central core. The core preferably contains plant or crop growth-stimulating nutrients comprised of organics derived from municipal biosolids and/or specific organics. The outer layer may comprise non-biosolid materials and form a barrier that controls the release of core constituents. The barrier can provide time release for the nutrients, control of odor from the core during storage, and control of decomposition during storage, particularly from moisture.

In another embodiment a granule comprises a biosolid core that is coated (encapsulated) with one or more polymers. This embodiment is particularly desired when odoriferous biosolids comprise the core and wetting is a concern because a large number of inexpensive polymers are available or can be made that have desired properties.

In another embodiment a granule with a biosolid-containing core is prepared by processing the biosolid to USEPA 40 CFR Part 503 Class A pathogen standards and EQ (exceptional quality) standards for contained metal concentrations and vector attraction standards. After processing, the core acquires one or more outer layers wherein at least one outer layer comprises zinc in excess of 2800 ppm (concentration wgt/wgt in the layer). In another embodiment the entire granule has a total zinc concentration in excess of 2800 ppm (concentration wgt/wgt in the granule). In advantageous embodiments the zinc in the granule is in excess of 3500, 4000, 5000, 7000, 10000, 15000, 20000 or even 30000 ppm. Such granules meet USEPA highest regulations for sale as a Class A biosolid-containing fertilizer product. The granules contain value enhancing levels of zinc that otherwise is not readily allowed in biosolid fertilizer. Present regulations (40 CFR 503.13, Table 3 (2001)) restrict zinc concentration of biosolids to 2800 ppm. This concentration is well below the preferred commercial farming concentrations for zinc micronutrient fertilizers, which range from 5000 ppm to 30000 ppm. Analogous concentrations for other micronutrients such as iron, manganese, copper, boron, molybdenum and cobalt may be determined and used as well.

Another embodiment is a bioremediation granule that contains a core having growth-stimulating nutrients for microorganisms, wherein the materials are selected for their organic catabolic activities and are located within the outer granule layers. Another embodiment is a method for producing the granules.

Yet another embodiment is a granule contains at least two layers. Different nutrients (charged ion micronutrients, phosphorous, nitrogen, for example) can be incorporated into different layers and each layer may be of a different hardness and/or thickness or mass. In one embodiment a nutrient(s) that desirably should be released early is located in the outermost layer and a nutrient(s) that should be released later is located closer to the core and/or in the core of the granule.

In yet another embodiment the core is constructed of nutrients blended with organic material that originated from municipal biosolids or sludge. Because of the 40 C.F.R. part 503 Rule of the USEPA, that product cannot contain more than 2800 ppm of zinc (Table 3 rule), farmers prefer high zinc containing fertilizers (eg. 1 to 3 percent by weight, 10,000 to 30,000 ppm) as in zinc sulfate. This type of product cannot be made with biosolids because such a zinc concentration would exceed the 503 rule. By incorporating the biosolids containing part of the fertilizer granule in the core and demonstrating that the core has been manufactured to class A, EQ and Vector Attraction Standards before the outer layer or layers is added, the 503 rule would not pertain to the additional layers. Therefore a highly valuable product can be made to meet the needs of commercial agriculture and still incorporate a high concentration of biosolids organic matter, which is increasingly recognized to benefit crop yields. In desirable embodiments therefore, a core contains nutrients such as N, P, K or S and biosolids are processed to Class A, EQ and VA standards. In this embodiment the outer layer of the granule may contain zinc sulfate such that the zinc is delivered at a weight of 1 to 3 percent of the weight of the entire granule.

In yet another advantageous embodiment the granule core is constructed of an organic containing inorganic fertilizer. The organics could originate from municipal biosolids and could also contain specific nutrients designed to support a microbial community contained in a more outer layer. In this case the core may be surrounded by a thin intermediate separation layer and then a thicker microbe containing layer that comprises microbes such as specific soil bacteria (that can target crop roots or metabolize a toxic compound for example) useful in nutrient transfer, and finally by a thin outer protective polymer layer. This arrangement contains a separation layer that isolates the microbes in the more outer layer from the nutrients contained in the core. The next thicker outer layer of microbes may include buffers and other materials for microbe growth or long term stasis.

Yet another embodiment of the invention is directed to bioremediation granules containing microorgainsms. In such granules, release of microorganisms may be preferably stimulated under predetermined environmental conditions which would activate or dissolve the outer protective layer of the granule. The microorganisms upon their release, are able to utilize growth-stimulating nutrients derived from other components of the granule.

Other embodiments and advantages of the invention are set forth in part in the description, which follows, and in part will be obvious from this description, or may be learned from practice of the invention.

DESCRIPTION OF THE INVENTION

Embodiments of the invention relate to processing of biosolids into granules, the granules produced, methods of using the granules as fertilizer, and methods of using the granules for bioremediation. Although fertilizers and bioremediation materials have been known as described above those methods often required expensive processing to inactivate harmful or noxious substances such as bacteria, and are difficult to implement on a large scale. Further, the biosolids may generate undesirable substances during storage, and some form through air contact with the biosolid. On the other hand, some of the same undesirable substances that form or create noxious odors actually are desirable in fertilizer. According, the issue of optimizing the use of biosolids devolves to the issue of control of biosolid particles to maintain desirable features useful for fertilizer or other downstream uses while minimizing the problems such as odor.

Prior work to control biosolids, such as by processing into chemically homogeneous granules using techniques developed for fertilizer manufacture generally has failed to address many of the problems. The prior fertilizer processes are not ideal for biosolid treatment, particularly because of the homogeneous character of the granules produced. A homogeneous granule tends to react with water, oxygen and other substances during storage because all species of components that make up the granule are present at the granule surface. This feature of homogeneous granules is particularly a problem with biosolids because of the general reactivity of components of the biosolids. During storage, the biosolid off-gasses, and active or activatable components of the biosolid may be undesirably exposed to the air, humidity and even physical contact. During their use, the activity of those components, while desired, may be uncontrolled, as the particles dissolve at a rate determined generally by uncontrolled factors such as rainfall, temperature and so on. Accordingly, the inventors realized, great improvement to the art of biosolid use may be obtained by 1) limiting exposure and activation of active substances in the biosolid during storage, and 2) control of biosolid disintegration during use, while limiting cost.

In conducting studies pursuant to this insight, it was surprisingly discovered that biosolids can be processed into granules constructed of a core with one or more surrounding layers to give controlled performance to match the desired use of the granules. Such granules provides distinct advantages, both in processing of biosolids and application of the constituent elements of the biosolids as fertilizer. The release of odors associated with biosolids can be prevented or at least reduced by the surrounding layers. Desirable embodiments alleviate problems associated with safety, odor control and safety of distribution because the granule surface does not expose in an appreciable way the biosolid. Consequently, the end product of processing can be immediately applied to fields as fertilizers or simply stored until needed without creating an undue environmental hazard or nuisance. Further, using layered granules as fertilizer (e.g. such as urea), one can control the rate at which one or more nutrients can enter the soil structure.

Accordingly, one embodiment of the invention is directed to biosolid granules constructed with at least a core with one or more concentric surrounding layers, wherein the biosolids are present in the core, in one or more of the layers, or in both. Preferably, the surrounding layers are distinguishable from the core with respect to one or more of the following characteristics: nutrient or micronutrient content, density, hardness, solubility, composition, microbial content and permeability, as in permeability to odors or the permeability of nutrients that might volatize to the atmosphere or leach into the soil. The invention includes methods for manufacturing and using such granules, which preferably incorporate a plurality of concentric layers. The preferred method for manufacture of biosolid-containing granules comprises processing biosolid or organic sludge material into a USEPA Class A fertilizer according to 40 C.F.R. 503.13 Table 3 EQ regulations; granulating said fertilizer to form a core material; and forming a plurality of concentric layers around the core of the granule. In a further embodiment of the invention, a method is provided for making the granule wherein the core, or one or more of the concentric layers, is added at a processing temperature that is higher than the processing temperature at which the remaining concentric layers are added. The lower temperature used for the concentric layers may be exploited by adding heat sensitive microorganisms to the layer material. Biosolids, preferably municipal sludge processed into a USEPA Class A fertilizer, may be processed into any number of layers such as one or more layers that are distal or proximal to the core, or the core itself.

Biosolids that can be processed according to the invention include any and all organic waste materials. This includes, but is not limited to, sludge, sludges resulting from the production of antimicrobials and other pharmaceutical products; bacterial fermentation sludges; sludges resulting from the production of beer and wine; mushroom compost waste; paper mill sludges; organic sludges that are in the majority degradable by microorganisms but that are not of biological or microbiological origin; sludges produced from foodstuff production, e.g., grain products; sludges that contain microorganisms from recycled organic products such as paper products; sludges produced by microorganisms during production of chemicals; industrial sludges; other byproducts of microbial activity, particularly related to foodstuff production; and sludges from animal husbandry—particularly produced from wastes that have been digested or otherwise broken down by microorganisms.

Sludge wastes may be processed by any of a wide variety of techniques known to skilled artisans to produce biosolids according to embodiments of the invention. For example, U.S. Pat. No. 4,079,003 issued to Manchak on Mar. 14, 1978 describes a method of transforming sludge into ecologically acceptable solid material. More recently, U.S. Pat. No. 6,325,035 issued to Hojsgaard on Dec. 4, 2001 describes heating and cooling sludge prior to entry into a digester. U.S. Pat. No. 6,256,902 issued to Flaherty et al. on Jul. 10, 2001 describes a method and apparatus for drying and deagglomerating substances processed from sludge. U.S. Pat. No. 6,237,246 issued to Millard on May 29, 2001 describes dewatering sludge to a cake and mixing with an alkaline material and drying. U.S. Pat. No. 6,103,191 issued to Luker on Aug. 15, 2000 describes a continuous flow sludge system that heats and dewaters sludge. These techniques and others are known to skilled artisans and are intended for use in embodiments of the invention.

Granule Formation

Granules according to embodiments of the invention may be formed by adding layers to a core particle. The layer material(s) and method of their use are optimized to limit gas exchange of the encapsulated biosolid with surrounding air. In another desirable embodiment a layer material is chosen that contains a high (final granule) concentration of more than 2800 ppm zinc. In yet another desirable embodiment micro-organisms are included in one or more layers of the granule. In a particular advantageous embodiment a core that typically is an irregular shaped and sized solid is coated with a material such as a polymer that binds minerals such as zinc and iron, and also one or more micro-organisms selected for a particular enduse.

As a first step in some embodiments, core particles of biosolids or another material are obtained as starting material. Preferred processes for generating core particles include, but are not limited to, 1) jet grout drilling introduction, 2) rotary hollow stem auger/trimmie slurry introduction, 3) hydraulic fracturing and 4) freeze placement. Jet grouting utilizes high pressure delivery into the subsurface to "fluidize" the formation and allow introduction of materials. Rotary hollow stem/trimmie placement involves pumping slurried materials into the subsurface annulus of the borehole. Hydraulic fracturing utilizes low pressure delivery of a slurry to create vertical or horizontal fractures in the subsurface. Hydraulic fracturing enables delivery of particles described herein when lower shear and pressures are needed to preserve particle integrity. Freeze wall placement allows direct introduction of the particles into a confined zone of the subsurface. U.S. Pat. No. 5,984,992 describes a method of using a cross-pipe reactor and standard fertilizer granulation equipment operated by the Cypress Chemical Company (Helena, Ark.). Such granules can also be manufactured by using a Spouting Fluidized Bed Dryer designed by Energy Engineering, Ltd. (South Africa). Manufacture of such concentrically designed granules can benefit from conventional and commercially-available granulation machinery as sufficiently modified according to parameters of embodiments described herein.

In a second step one or more layers of material, such as polymer, polymer precursors, dust, smaller clay particles, or biosolid material, may be applied to the core particle. A wide variety of materials and methods of their use are suitable for forming a layer. Embodiments of the invention further include adding a chemically durable (polymer or chemical coating) or mechanically durable (colloidal attachment, dust and the like) coating to the core that, variously may: 1) limit gas transfer from inside the particle to the air and thereby control odor; 2) incorporate a high amount of zinc in the coating, adding value as a fertilizer; and 3) incorporate one or more types of bacteria in the coating to add value as a bioremediation, material or tool, pesticide management material or tool or other use where a bacteria with nutrient desirably may be distributed, such as a farm or waste site. In advantageous embodiments at least a micronutrient such as zinc, at least a microorganism or both are added to one or more coating layers.

In an embodiment the coated core is ready for use without further treatment such as washing or dewatering. In another embodiment the granule is further treated prior to use. The further treatment step may comprise a drying period or operation. The method may also comprise a polishing step of adding a substance that adheres to the completed granule and gives the final product a desired quality. For example, product that is destined for a humid environment may be further improved by addition of a partially hydrophobic coating or other coating that helps seal out moisture. For this embodiment, preferably the outside surface of the granule from the coating has a polymer such as methyl cellulose or polyvinyl alcohol or other fairly non-hygroscopic material. Adding, by for example, spray a hydrophobic mist to the material will improve stability with respect to water as the added hydrophobic material will bind to and reinforce the hydrophobic character of the surface.

Methods and materials were discovered that provide greater economy, which can be very important for sludge remediation applications that compete commercially with landfills. Polymeric materials were found to provide good coating at a low cost. These materials are particularly useful in methods that begin with inexpensive fracturing or separation of sludge into particles and then coating the particles using low temperature processes that conserve energy. In particular, it was found that in many cases, using the biosolid as the core rather than the coating provides a less energy intense manufacturing procedure.

Cost savings are achieved in some embodiments by a combination of: 1) minimal manipulation of biosolids made possible by coating processes that accomodate irregular sized and shaped cores; 2) use of a variety of low cost coating agents such as cellulose, lignin, synthetic polymers or polymer precursors; and 3) use of a low energy low temperature process that binds up micronutrients and microorganisms as needed into the granule.

Desirably, and particularly for high zinc content granules having, for example more than 0.01%, 0.1% or even more than 1% wgt/wgt zinc, the divalent cationic properties of zinc may be used for forming the layer. In this case, a polyanionic polymer becomes fixed in place upon contact with divalent cations of zinc, calcium and so on, and trivalent cations of iron. In an embodiment the polymer is added first and loosely coats the core. Then the cation or cation mixture is added, and fixes the polymer in place. This layer formation process requires no or little energy because forming ionic bonds between the micronutrient and the anionic polymer (or anionic surface of the core) is exothermic. Accordingly, addition of zinc (and/or other micronutrient cations) may occur by regular mixing processes or flow streams. Polyanionic substances particularly useful for these embodiments include for example, alginate, dextran sulfate, cellulose acetate, pectin, lignin, derivatized acidic lignin, and the like.

Biosolid granules may of most any size as determined by the manufacturing process or downstream use. Preferably, granules are between about 0.5 mm and about 10.0 cm in diameter, more preferably between about 1.0 mm and 5.0 cm, and more preferably between about 2.0 mm and about 10.0 mm. Granules may be of most any shape, generally determined by the manufacturing process, such as, for example, round, oval, or rectangular. Alternatively, granules may have no definable shape, may be irregularly shaped or have inconsistent shapes. Preferably, granules for commercial agriculture have a hardness level of at least three pounds, but may have a hardness of four pounds or greater, as may be needed during processing, transportation or use.

In various aspects of the invention, one or more concentric layers of the granules may have a higher pH, moisture level, Eh, or degree of hardness than the other layers or the core. In a further aspect, the granule contains less than 25% water, preferably less than 15% water and more preferably less than 10% water. In a preferred embodiment of the invention, the biosolids achieve a USEPA Class A pathogen, EQ and vector attraction standard as per 40 CFR part 503 (2001). In another preferred embodiment the biosolids achieve a USEPA Class B pathogen standard as described in 40 CFR.

Another embodiment of the invention is directed to biosolid-containing granules that also contain micronutrients. Micronutrients are simple chemicals or chemical compounds, either individually or together with other substances that are required for or otherwise serve as essential or non-essential substances for the maintenance, growth or survival of a particular microorganisms, or foodstuffs that contain or can be converted by the microorganism or an associated process into such substances. These substances include, but are not limited to, zinc, iron, manganese, copper, boron, molybdenum and cobalt. Micronutrients also include salts of these substances, such as calcium nitrate, magnesium sulfate, magnesium nitrate, ferrous sulfate, ferrous nitrate, manganese sulfate, manganese nitrate, copper sulfate, copper nitrate, boric acid, sodium borate, zinc sulfate, zinc nitrate, sodium molybdate, ammonium molybdate, potassium chloride, disodium dihydro molybdate, cobalt chloride hexahydrate, nickel chloride hexahydrate, chelated complex of copper, calcium, iron (Hampene), zinc, magnesium, manganese, sodium borate, and ammonium, sodium molybdate and the like. These micronutrients may be provided by the core, by one or more of the layers, by an encapsulating layer or by any combination thereof.

In a particularly advantageous embodiment one or more of the micronutrients listed above is provided at a lower concentration in a granule coating than in core made of the biosolid.

Another embodiment of the invention is directed to biosolid-containing granules that further contain microorganisms. Microorganism that can be included in granules of the invention may comprise bacteria, parasites, yeast, fungi, or combinations thereof (e.g. such as mixtures of microorganisms present in and isolated from natural flora, soil, water and within or on other organisms, genetically engineered microorganisms). Preferably, microorganisms of the invention are capable of metabolizing a toxic chemical or compound, replenishing depleted soil microflora and/or enhancing the transfer of nutrients to a target crop. Examples of microorganisms that are useful in the invention include, but are not limited to, *Pseudomonas stutzeri* strain KC, *Nocardia salmonicolor, Nocardia globerula, Nocardia paraffinae, Nocardia poaca, Pseudomonas putida, Pseudomonas oleovorans, Pseudomonas aeruginosa, Pseudomonas fluoroscens, Mycobacterium phlei, Mycobacterium lacticola, Mycobacterium paraffinicum, Aerobacter aerogenes, Bacillus subtilis, Bacillus lichiniformis, Bacillus circulans, Bacillus polymyxa, Bacillus coagulans, Bacillus macerans, Bacillus azotofixans, Sacharomyces cereviseae, Bacterium acidipropionci, Bacterium aliphaticium liquifaciens, Arthrobacter paraffinens, Rhodococcus rhodochrous, Acinetobacter calcoaceticus, Clostridium cellulolytican, Clostridium aerotolerans, Clostridium acetobutylican, Clostridium pasturianum*, the various *Azotobacter* sp., *Bacillis* sp., *Clostridium* sp., *Fusarium* sp., *Candida* sp., *Flavobacterium* sp., *Corynebacterium* sp.,

*Achromobacter* sp. *Acinetobacter* sp., *Rhodococcus* sp., *Pseudomonas* sp., *Mycobacterium, Nocardia* sp., *Rhodotorula* sp., filamentous fungi such as *Penicillium* sp. and *Phycomyces* sp., and *Apergillus* sp., *Streptomyces griseus*, among others. Genetically engineered microorganisms are preferably engineered to metabolize or improve the ability of the microorganism to metabolize toxic chemicals and compounds.

Another embodiment of the invention is directed to biosolid-containing granules that comprises microorganisms, and further comprises micronutrients beneficial to the microorganisms. Either or both, the micronutrients and/or the microorganisms may be located in the core or in one or more of the layers. In a preferred embodiment, micronutrients are contained within the core or within a layer interior to a layer containing microorganisms. Alternatively, microorganisms may be contained within the core and a plurality of micronutrients and the biosolids located in the layers. In one aspect of the invention, the relative mass of one or more of the concentric layers is less than the relative mass of the core.

Another embodiment of the invention is directed to biosolid-containing granules that are further encapsulated. Encapsulation may be partial or complete, and preferably the granule coating reduces the rate of emission of odors associated with the granule by at least 2 times, 4, 10, 30, 100 or even 1000 times. In a preferred embodiment, an outer layer of the granule comprises a non-biosolid material that reduces the rate of emission of odorants associated with the granule. Materials that can be used to encapsulate a granule are preferably polymers. Polymers that can be used preferably form a rigid structure and comprise or can be manufactured from, for example, polyethylene, polypropylene, polyacrylamide, ethylene, propylene copolymer, ethylene vinyl acetate copolymer, vinylidene chloride, vinyl chloride, vinylidene chloride-vinyl chloride copolymer, polystyrene, and biodegradable polymers such as agarose.

In a preferred embodiment, the outermost layer of the granule may be made from one or more of the materials such as, for example, azo-group based polymers, natural or synthetic polymers, dried organic material such as lignin or plant polysaccharides, and dried inorganic material such as an inorganic nutrient fertilizer like diammonium phosphate or ammonium sulfate, a cationic linked polymer such as a calcium, magnesium or zinc linked polymer, or a polysaccharide polymer.

In a particularly desirable embodiment a coating comprises one or more polyanionic polymers such as a natural polymer known as gum arabic, carrageenan, sodium alginate, pectic acid, lignin or lignin derivative, tragacanth gum, almond gum and agar; semi-synthetic polymer such as carboxymethyl cellulose, sulfated cellulose, sulfated methylcellulose, carboxymethyl starch, phosphated starch and lignin sulfonic acid; and synthetic polymer such as maleic anhydride copolymers (including hydrolyzates thereof), acrylic acid, methacrylic acid or crotonic acid homopolymers and copolymers, vinylbenzenesulfonic acid or 2-acrylamido-2-methylpropanesulfonic acid homopolymers and copolymers, and partial amide or partial ester of such polymers and copolymers, carboxymodified polyvinyl alcohol, sulfonic acid-modified polyvinyl alcohol and phosphoric acid-modified polyvinyl alcohol. Of these, the natural polymers are most preferred and anionic polymers derived from cellulose or a sea weed product, being inexpensive, are especially preferred.

Preferably at least some of the anionic polymer(s) are cross-linked with one or more multivalent cations selected from the group of zinc, iron, manganese, copper, boron, molybdenum and cobalt. The term "at least some" means that at least 10% (by moles) of the polycations involved in crosslinking the polymers are selected from this group. Other cations, such as the calcium, and magnesium ions may be present as well. The use of a divalent or trivalent cation from that listed in the group with the anionic polymer(s) serves the dual purpose of providing a high level of the nutrient in the granule while providing mechanical strength to the coating. In an embodiment a coating which comprises anionic polymer crossbridged by cations is designed to dissolve gradually upon wetting. In a related embodiment the distribution of polycations, may be altered to achieve the desired stability in the presence of humidity. In another embodiment one or more monovalent cations such as sodium and potassium are added as needed to modify the structural and dissolving properties of the formed coating. In yet another embodiment the anionic coating is stabilized by a cationic polymer such as a cation-modified polyvinyl alcohol. In another embodiment the coat is formed from a cationic polymer such as cation-modified polyvinyl alcohol.

In yet another embodiment the coating is made from a nonionic polymer such as, for example, hydroxyethyl cellulose, methyl cellulose, Pullulan (amorphous, readily water-soluble high molecular polysaccharide produced by microbial fermentation of starch), soluble starch and oxidized starch.

A variety of techniques may be used to form and harden the coat. For example, coacervation processes (disclosed, for example, in U.S. Pat. Nos. 2,800,457 and 2,800,458), interfacial polymerization processes (disclosed, for example, in Japanese Examined Patent Applications No. 19574/1963, 446/1967 and 771/1967 and U.S. Pat. No. 3,796,669), in-situ polymerization processes (disclosed, for example, in Japanese Examined Patent Application No. 9168/1961 and U.S. Pat. Nos. 4,001,140 and 4,100,103) have merit. A coating may be made using the dispersing medium materials and processes shown in U.S. Pat. No. 4,601,863 to Shioi et al. After mixing core particles (preferably biosolids) in the "microparticle" dispersion media described by Shioi et al., coated particles form by substantially removing the dispersing medium from the dispersion as prepared or as concentrated by filtration or the like. The dispersing medium as described therein typically is then dried, but for large scale the medium preferably is recycled, with added (replaced) components as needed.

A particularly advantageous feature of the latter embodiments using the Shioi technique and other techniques when fairly hydrophobic materials are used, is that the coated granules produced are somewhat hydrophobic and do not adsorb or absorb water readily. The coating material (usually polymer) in each embodiment may be chosen or modified to increase the hydrophobic characteristic of the final product. A more hydrophobic material will store well, and give a longer duration dissolution time during use in a wet environment. Yet another desirable embodiment is a method of further inhibiting odor wherein the surface of the coated granule is exposed to a spray, mist, or other dispersed form of a (preferably) hydrophobic substance that does not readily vaporize but fills up pores in the granule surface, thereby inhibiting exchange of air and large molecules. For example, a large mound of granules that contain a biosolid may be treated for odor control by spraying only the surface of the mound.

Multiple coatings are useful for embodiments of the invention. Multiple coatings help control gaseous exchange from materials in inner coating(s) and materials in the core that lead to odor. In an embodiment a high concentration of zinc (or other listed micronutrient cation) is provided in an inner layer and the zinc leaches out slowly due to the presence of an outer layer. The zinc may be added by coating the core (or an inside coat) with an anionic material and then adding zinc to the coating material before, during or after the coating step. The zinc attaches by ionic bonding.

Another embodiment of the invention is directed to encapsulated biosolid-containing granules that provide a timed release coating. Timed release coatings are coatings that partially or completely surround a solid particle and that partially or completely dissolves or otherwises releases at a particular rate the active contents of the particle. The rate is often dependent on the thickness of the coating. Any of a variety of polymers, all well known to those of ordinary skill in the art, can be used to control the release time of the contents of a particle. In another embodiment of the invention, the outermost layer or layers of the granule comprises a heat-sensitive polymer, or water soluble material, suitable for delaying the release of the material in the granule core and innermost concentric layers until a certain ambient temperature is reached or the granule is exposed to water. Thus, the granules can be applied to arable land and their effect triggered by specific environmental conditions.

Another embodiment of the invention provides water sensitive polymers and water sensitive layer(s) wherein a layer delays release of a desired substance from the granule until exposed to water. Polymers and also systems are contemplated that release a substance directly and also that increase layer permeability to allow release when the water content exceeds 20%, 30%, 50%, 75% 90% and 100%.

Another embodiment of the invention provides one or more temperature sensitive polymers wherein a layer delays release of a desired substance from the granule until exposed to high heat. Polymers and also systems are contemplated that release a substance directly and also that increase layer permeability to allow release when the temperature exceeds 10 degrees, 15 degrees, 20 degrees, 25 degrees, 30 degrees, 35 degrees, 40 degrees, 45 degrees, 50 degrees, and even 55 degrees centigrade. In an embodiment a material is chosen that releases one or more substances when the temperature exceeds 60 degrees and even 70 or 80 degrees centigrade. This latter embodiment is particularly useful to distinguish granules that are exposed to summer sun from granules that are within (covered by) soil.

Another embodiment of the invention is directed to methods of bioremediation (or simply remediation) comprising application of biosolid-containing granules of the invention to a desired substance or area in need thereof. Bioremediation is a process of treating a noxious or unwanted substance (e.g. a toxic chemical or waste compound), with another substance that is capable of destroying or removing the offending substance, or converting the substance into a less harmful (e.g. less toxic) or completely harmless (non-toxic) material. Treatment with biosolid-containing granules of the inventions allows for the introduction of one or more specific chemicals, chemical compounds, enzymes, microorganisms, or combinations thereof that are necessary or desirable for the bioremediation process or simply beneficial to the area being treated.

A significant advantage of the invention is that biosolids, normally a waste product, can be converted into useful products. Such products can be simply incorporated into soil or water bodies without adverse consequences. Another advantage is that these same granules, by incorporating additional reagents during manufacturing, can also be converted into entirely new products such as fertilizers, herbicides, insecticides, pesticides and the like. Incorporation can be by either passively through association during the manufacturing process or actively through covalent or other bounding with the components of the granule. Such new products can be utilized, for example, in the process of remediation. By way of example, micronutrients such as zinc and microorganisms such as nitrogen fixing bacteria can be added to granules of the invention. These granules are now suitable for many different types of bioremediation. It is well known to those skilled in the art that zinc is important to commercial agricultural. However, at least in part, zinc is restricted in biosolids product manufacture by the Table 3 levels, e.g., to be lower than 2800 ppm as required by 40 C.F.R. Part 503.13 of the USEPA's biosolids/sludge regulations. Thus, biosolids will normally contain no or very little zinc. By using the layering technique of the invention, the integrity of the 503 rule is maintained in that biosolids are incorporated into particles. However, a commercially valuable zinc-containing fertilizer product can be produced (e.g. levels above 2,000, preferably 2,800 ppm, to approximately 30,000 ppm), by adding zinc into the manufacturing process, preferably during application of the layers.

Methods of the invention include in situ remediation which has the potential for providing low-cost treatment options for environments contaminated with hazardous wastes. Environments that can be treated include areas of land (e.g. landfills, contaminated fields) or water (e.g. streams, lakes, harbors). The biological treatment options provides a means of treating hazardous materials without the need for extraction or evacuation of contaminated materials. In addition, bioremediation, both biostimulation and bioaugmentation, requires periodic or continuous introduction of nutrients or buffers to sustain active populations of bacteria, capable of degrading hazardous wastes in situ. For treatment of many sites, delivery of nutrients or other environmental modifiers may be needed over sustained periods of time. The present invention provides an inexpensive means of delivering micronutrients (e.g. controlled levels of nutrients to maintain active microorganism populations), microorganisms, or chemical reactants to effect degradation over extended periods of time. This is performed by delivering a solid phase material capable of delivering via dissolution the nutrients, environmental modifiers and/or reactants capable of biologically remediating an environment contaminated with hazardous materials. Further, the use of a temperature related solubility outer layer or capsule would allow more control of nutrient release in a growth season. Nutrients could be applied, but would be restricted from plant uptake until proper nutrient requirements are achieved thereby optimizing plant growth and minimizing nutrient leaching or the loss of nutrients to soil levels unreachable by plant roots. Overall, biosolid-containing granules of the invention provide products that offer nutrient and microbial control to meet crop needs effectively and economically, thereby increasing yields and fertilizer costs (as in multiple applications) as to increase profits for the farmer.

Biosolid granules containing a core coupled with a micronutrient containing outer layer has the advantage of being able to contain concentrations of plant growth stimulating metals like zinc, above the biosolids regulated levels, which are desired in commercial farming. The containment and control of odors that emit from the core biosolids-containing structure permits wider use of biosolids products in gardening, environmental management, in general municipal land management as well as in commercial fertilizer usage.

Biosolid-containing granules of the invention may also contain toxic compounds such as, for example, herbicides, insecticides, pesticides and combinations thereof, within a separate layer or layers of a granule of nutrients. The combination of nutrients (e.g. the biosolids) and control agents plus the concept of differential hardnesses or compositions, such that solubility of different nutrients is controlled, so that nutrients or pest controls can be managed with fewer applications during the growing period.

Other embodiments of the invention are directed to methods for administering biosolid-containing granules to crops as fertilizers, to deliver specific microorganisms to replenish depleted soil microflora, to enhance the transfer of nutrients to the target crop, to deliver one or more herbicides, insecticide or pesticides. This provides a bioremediation agent, wherein microorganisms contained within the granule metabolize, catabolize or otherwise degrade target materials in the soil to which the granules are applied.

Other embodiments and uses of the invention will be apparent to those skilled in the art from consideration of the specification and practice of the invention disclosed herein. All references cited herein, including all U.S. and foreign patents and patent applications, are specifically and entirely incorporated by reference. It is intended that the specification and examples be considered exemplary only, with the true scope and spirit of the invention indicated by the following claims.

What is claimed is:

1. A granule comprising a plurality of layers with a core having at least one inner layer proximate to the core and at least one outer layer distal to the core, wherein at least one layer has a composition that is different from at least one other layer and said granule contains biosolid material.

2. The granule of claim 1 wherein the core comprises a biosolid material.

3. The granule of claim 2 wherein the biosolid material comprises class A biosolids.

4. The granule of claim 1 wherein one or more of the plurality of layers comprise non-biosolid materials.

5. The granule of claim 4 wherein the non-biosolid materials are selected from the group consisting of ammonium sulfate, azo-group based polymers, calcium-linked polymer, cationic-linked polymers, diammonium phosphate, dried organic materials, dried inorganic materials, fertilizers, lignins, magnesium-linked polymers, natural polymers, nutrient fertilizers, plant polysaccharides, synthetic polymers, and combinations thereof.

6. The granule of claim 1 which has a diameter of less than about 10 mm.

7. The granule of claim 1 which contains less than ten percent water.

8. The granule of claim 1 wherein one or more layers of said granule, but not all, have a higher pH than the core or one or more other layers of said granule.

9. The granule of claim 1 wherein one or more layers, but not all, have a higher moisture level than said core or one or more other layers of said granule.

10. The granule of claim 1 wherein one or more layers, but not all, have a higher pH than the core or one or more other layers of said granule.

11. The granule of claim 1 wherein one or more layers, but not all, have a higher degree of hardness than said core or one or more other layers of said granule.

12. The granule of claim 1 wherein the at least one outer layer comprises a non-biosolid-that reduces the rate of emission of odorants associated with said granule.

13. The granule of claim 1 further comprising a coating that at least partially encapsulates said granule.

14. The granule of claim 13 wherein the coating comprises a material selected from the consisting of argose, biodegradable polymers, ethylene, ethylene vinyl acetate copolymer, polyacrylamide, polyethylene, polypropylene, polystyrene, propylene copolymer, vinyl chloride, vinylidene chloride, vinylidene chloride-vinyl chloride copolymer, and combinations thereof.

15. The granule of claim 1 further comprising one or more micronutrients.

16. The granule of claim 15 wherein the micronutrients are located in the core, in one or more of the plurality of layers, or both.

17. The granule of claim 15 wherein the micronutrients are selected from the group consisting of ammonia, boron, cobalt, calcium, copper, iron, magnesium, manganese, molybdenum, zinc, and any salts thereof, and combinations thereof.

18. The granule of claim 16 wherein the salts are selected from the group consisting of as ammonium molybdate, boric acid, calcium nitrate, chelated complex of copper, cobalt chloride hexahydrate, copper nitrate, copper sulfate, disodium dihydro molybdate, ferrous nitrate, ferrous sulfate, magnesium nitrate, magnesium sulfate, manganese nitrate, manganese sulfate, nickel chloride hexahydrate, potassium chloride, sodium borate, sodium molybdate, zinc nitrate, zinc sulfate, and combinations thereof.

19. The granule of claim 15 wherein the zinc is present in a concentration greater than about 2,000 ppm.

20. The granule of claim 15 further comprising a coating such that said micronutrients are released from said granule in a timed release fashion.

21. The granule of claim 1 further comprising microorganisms.

22. The granule of claim 21 wherein the microorganisms are capable of metabolizing a toxic chemical or compound, replenishing depleted soil microflora, enhancing the transfer of nutrients to a target crop, or a combination thereof.

23. A bioremediation method comprising contacting a plurality of biosolid-containing granules of claim 1 to an area in need thereof.

24. The method of claim 23 wherein the area is a body of land or water.

25. The method of claim 23 wherein the biosolid-containing granules further contain microorganisms, micronutrients or both.

26. The method of claim 25 wherein the microorganisms metabolize contaminants present in said area.

27. The granule of claim 1, further comprising a toxin.

28. A method for fertilizing an area comprising contacting a plurality of biosolid-containing granules of claim 1 to an area in need thereof.

29. The method of claim 28 wherein the area is a body of land or water.

30. The method of claim 28 wherein the biosolid-containing granules comprises cationic polymer and zinc.

31. A method for treating an area with a toxic compound comprising contacting said area with a plurality of biosolid-containing granules of claim 1 that further contains said toxic compound.

32. The method of claim 31 wherein the toxic compound is selected from the group consisting of herbicides, insecticides, pesticides, and combinations thereof.

33. A method for the delayed release of a desired substance to an area comprising contacting a plurality of biosolid-containing granule of claim 1 to said area wherein one or more outer layers of said granules comprise a heat-sensitive polymer that delays release of said desired substance from the granule until exposed to a certain temperature.

34. The method of claim 33 wherein the desired substance is selected from the group consisting of fertilizers, herbicides, micronutrients, pesticides, and combinations thereof.

35. The method of claim 33 wherein the temperature is greater than 15° C.

36. A method for the delayed release of a desired substance to an area comprising contacting a plurality of biosolid-containing granule of claim 1 to said area wherein one or more outer layers of said granules comprise a water-sensitive polymer that delays release of said desired substance from the granule until exposed to water.

37. The method of claim 36 wherein the water content exceeds 30%.

38. A method of manufacturing a biosolid-containing granule comprising:

generating a core particle, wherein core particle has a composition that comprises biosolid material; and applying a layer of material to said core particle, wherein said layer has a composition that is different from said composition of said core particle.

39. The method of claim 38 wherein the core particle is generated by a process selected from the group consisting of a hydraulic fracturing, freeze wall placement, jet grouting, rotary hollow stem auger/trimmie placement, and combinations thereof.

40. The method of claim 38 wherein the layer is formed by a process selected from the group consisting of a cross-pipe reaction process, a spouting fluidized bed drying process, and combinations thereof.

41. A bioremediation method comprising contacting a plurality of biosolid-containing granules to an area in need thereof, wherein each granule comprises at least one layer with a core wherein said each granule contains biosolid material.

42. The method of claim 41 wherein the area is a body of land or water.

43. The method of claim 41 wherein the biosolid-containing granules further contain microorganisms, micronutrients or both.

44. The method of claim 43 wherein the microorganisms metatabolize contaminants present in said area.

* * * * *